US011366263B1

(12) United States Patent
Ho et al.

(10) Patent No.: US 11,366,263 B1
(45) Date of Patent: Jun. 21, 2022

(54) BACKLIGHT MODULE

(71) Applicant: Chicony Power Technology Co., Ltd., New Taipei (TW)

(72) Inventors: Hsuan-Wei Ho, New Taipei (TW); Yi-Cheng Chang, New Taipei (TW); Shin Liu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/454,058

(22) Filed: Nov. 8, 2021

(30) Foreign Application Priority Data

Aug. 12, 2021 (TW) ................................ 110129838

(51) Int. Cl.
| *F21V 8/00* | (2006.01) |
| *H01H 13/83* | (2006.01) |
| *H01H 13/02* | (2006.01) |
| *F21V 11/16* | (2006.01) |

(52) U.S. Cl.
CPC .............. *G02B 6/004* (2013.01); *F21V 11/16* (2013.01); *G02B 6/0021* (2013.01); *G02B 6/0043* (2013.01); *G02B 6/0055* (2013.01); *G02B 6/0066* (2013.01); *H01H 13/023* (2013.01); *H01H 13/83* (2013.01); *H01H 2013/026* (2013.01); *H01H 2203/052* (2013.01); *H01H 2219/036* (2013.01); *H01H 2219/044* (2013.01); *H01H 2219/052* (2013.01); *H01H 2219/06* (2013.01)

(58) Field of Classification Search
CPC ........ G02B 6/0021; G02B 6/04; G02B 6/043; H01H 13/023; H01H 13/60; H01H 13/66; H01H 13/83; H01H 2203/052; H01H 2219/036; H01H 2219/044; H01H 2219/052; H01H 2219/06

See application file for complete search history.

(56) References Cited

U.S. PATENT DOCUMENTS

| 7,608,792 | B1 | 10/2009 | Tsai | |
| 2014/0367238 | A1* | 12/2014 | Chen | ...................... H01H 13/83 |
| | | | | 200/5 A |
| 2018/0149797 | A1* | 5/2018 | Chen | ..................... G06F 3/0202 |

(Continued)

FOREIGN PATENT DOCUMENTS

| CN | 204230122 U | 3/2015 |
| CN | 205028824 U | 2/2016 |
| CN | 209691790 U | 11/2019 |

(Continued)

*Primary Examiner* — Keith G. Delahoussaye
(74) *Attorney, Agent, or Firm* — CKC & Partners Co., LLC

(57) ABSTRACT

A backlight module includes a circuit board, a light-emitting unit, a light-reflecting plate, a light guide plate, and a light-shielding sheet. The light-emitting unit is disposed on the circuit board. The light-reflecting plate is disposed above the circuit board. The light guide plate is disposed above the light-reflecting plate and includes a single-key light guide area. The single-key light guide area includes an accommodating hole and a light-blocking structure. The accommodating hole runs through the single-key light guide area and accommodates the light-emitting unit. The light-blocking structure and the light-emitting unit are arranged in a direction. The light-shielding sheet is disposed above the light guide plate.

13 Claims, 6 Drawing Sheets

(56) References Cited

U.S. PATENT DOCUMENTS

2020/0043681 A1    2/2020  Chen et al.
2020/0401235 A1*  12/2020  Liang ................. H01H 13/7057

FOREIGN PATENT DOCUMENTS

| | | |
|---|---|---|
| CN | 212725101 U | 3/2021 |
| TW | 200835289 A | 8/2008 |
| TW | M491198 U | 12/2014 |
| TW | I473137 B | 2/2015 |
| TW | I598918 B | 9/2017 |
| TW | I604486 B | 11/2017 |
| TW | I637290 B | 10/2018 |
| TW | 201907428 A | 2/2019 |
| TW | I697021 B | 6/2020 |
| TW | M606487 U | 1/2021 |
| TW | I724949 B | 4/2021 |

* cited by examiner

BACKLIGHT MODULE

CROSS-REFERENCE TO RELATED APPLICATION

This application claims priority to Taiwan Application Serial Number 110129838, filed Aug. 12, 2021, which is herein incorporated by reference.

BACKGROUND

Technical Field

The present disclosure relates to a keyboard device, and more particularly, to a backlight module used in a keyboard device.

Description of Related Art

The appearances of traditional keyboards are usually monotonous and dull, so computer peripheral manufacturers have developed light-emitting keyboards with excellent visual effects. A conventional light-emitting keyboard has a backlight module. The backlight module mainly uses a light guide plate to propagate the light emitted by light sources, so that all areas of the keyboard can emit light.

In order to achieve the purpose of individually controlling the light emission of each keyswitch, more than one light source is placed under each keyswitch. However, the disposing positions of the light sources will directly affect the light distribution, which leads to the problem of uneven brightness in different areas of each keyswitch. In addition, light sources can be divided into monochromatic light sources and mixed light sources. The mixed light sources are made of multiple chip packages emitting light of different colors which can mix light to emit white light. However, on either side with only a single chip, since the light energy of the chip is relatively strong, the problem of color unevenness may occur.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a circuit board, a light-emitting unit, a light-reflecting plate, a light guide plate, and a light-shielding sheet. The light-emitting unit is disposed on the circuit board. The light-reflecting plate is disposed above the circuit board. The light guide plate is disposed above the light-reflecting plate and includes a single-key light guide area. The single-key light guide area includes an accommodating hole and a light-blocking structure. The accommodating hole runs through the single-key light guide area and accommodates the light-emitting unit. The light-blocking structure and the light-emitting unit are arranged in a direction. The light-shielding sheet is disposed above the light guide plate.

In an embodiment of the disclosure, the single-key light guide area further includes a first microstructure portion. The light-shielding sheet has a hollow portion. The first microstructure portion is configured to guide light emitted by the light-emitting unit to the hollow portion.

In an embodiment of the disclosure, the light-blocking structure is a second microstructure portion. The second microstructure portion is composed of a plurality of microstructure units.

In an embodiment of the disclosure, the first microstructure portion is composed of a plurality of microstructure units. An area ratio of the microstructure units of the second microstructure portion in a unit area is greater than an area ratio of the microstructure units of the first microstructure portion in a unit area.

In an embodiment of the disclosure, the backlight module further includes a light-absorbing layer. The light-absorbing layer is disposed at a side of the light-shielding sheet facing the light guide plate, and opposite to the second microstructure portion in a stacking direction of the light-shielding sheet and the light guide plate.

In an embodiment of the disclosure, the light guide plate further includes a light guide structure. The light guide structure is disposed to surround the single-key light guide area and configured to guide light emitted by the light-emitting unit to the light-shielding sheet.

In an embodiment of the disclosure, each of the first microstructure portion and the light guide structure is composed of a plurality of microstructure units. An area ratio of the microstructure units of the light guide structure in a unit area is greater than an area ratio of the microstructure units of the first microstructure portion in a unit area.

In an embodiment of the disclosure, the backlight module further includes a reflective layer. The reflective layer is disposed between the light-shielding sheet and the light-emitting unit and entirely covers an upper opening of the accommodating hole.

In an embodiment of the disclosure, the light-reflecting plate is disposed on an area of the circuit board not occupied by the light-emitting unit and extends to an area within an inner edge of the accommodating hole.

In an embodiment of the disclosure, the light-emitting unit includes a red light chip, a green light chip, and a blue light chip. The red light chip, the green light chip, and the blue light chip are sequentially arranged in the direction.

In an embodiment of the disclosure, the light-emitting unit includes a blue light chip and a phosphor covering the blue light chip.

In an embodiment of the disclosure, the light-blocking structure includes two through holes. The through holes are respectively arranged at two sides of the light-emitting unit in the direction.

In an embodiment of the disclosure, the through holes respectively constitute parts of two heat dissipation channels passing through the backlight module.

Accordingly, in the backlight module of the present disclosure, the single-key light guide area of the light guide plate includes a light-blocking structure disposed on a side of the light-emitting unit, so the distribution of light emitted by the light-emitting unit can be adjusted, thereby effectively solving the problem of uneven brightness in different areas of a keyswitch. In addition, in the embodiment where the light-emitting unit includes chips of different colors, the light-blocking structure can also effectively solve the problem of color unevenness caused by uneven light mixing. In the embodiment where the light-blocking structure is a microstructure portion, the light-absorbing layer is disposed at the side of the light-shielding sheet facing the light guide plate and opposite to the light-blocking structure to achieve the purpose of light blocking. In the embodiment where the light-blocking structure is a through hole, in addition to achieving the same purpose of blocking light, the light-blocking structure can also be used as a heat dissipation hole. By disposing the light guide structure on the light guide plate to surround the single-key light guide area, the proportion of light emitted by the light-emitting unit propagating to the outside of the single-key light guide area can be effectively reduced. By arranging the chip with the highest brightness (for example, the green light chip) in the center of the light-emitting unit, the effect of solving the problem of color unevenness can be further improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
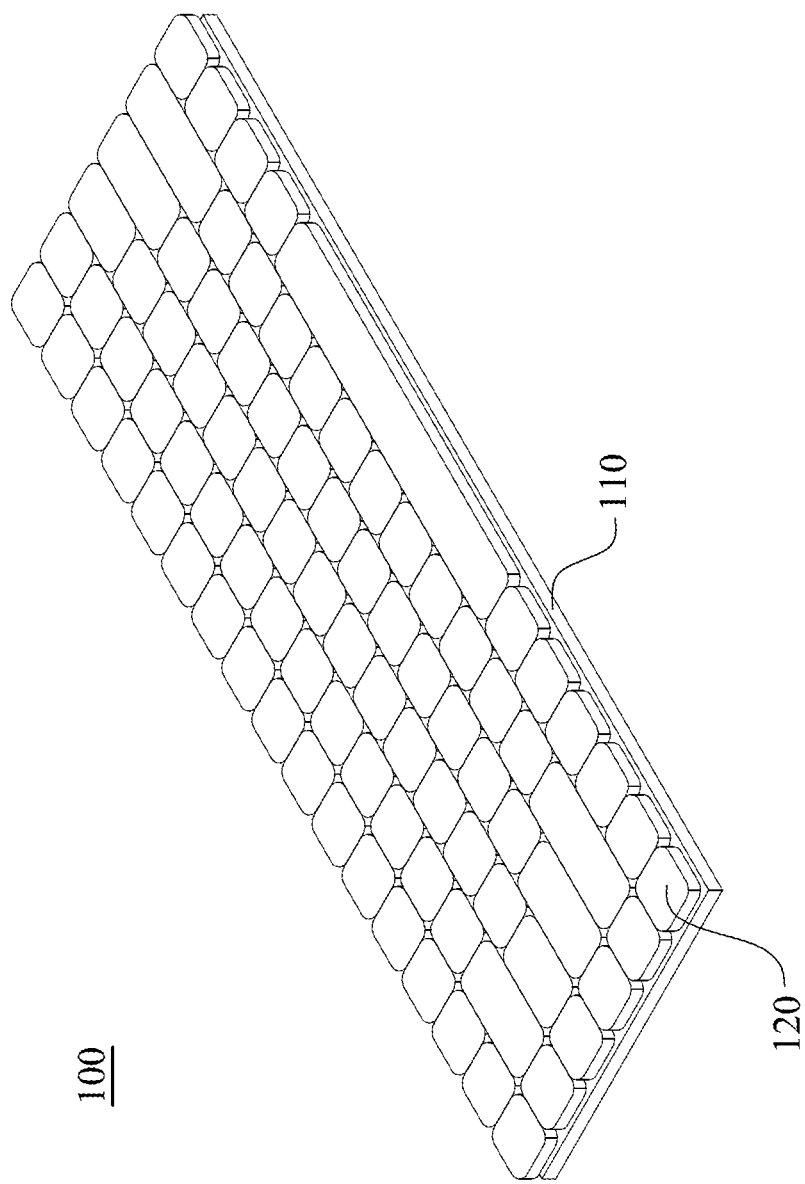
FIG. 1 is a perspective view of a keyboard device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a keyboard device 100 according to an embodiment of the disclosure. As shown in FIG. 1, in the present embodiment, the keyboard device 100 includes a bottom plate 110, a plurality of keyswitch assemblies 120, and a backlight module 200 (marked in FIG. 2). The keyswitch assemblies 120 are disposed over the bottom plate 110 and configured for the user to press. The backlight module 200 is disposed between the bottom plate 110 and the keyswitch assemblies 120, and is configured to emit light toward the keyswitch assemblies 120, so that the keyboard device 100 becomes a light-emitting keyboard. In addition, the keyboard device 100 of the disclosure can be an external keyboard (e.g., a keyboard with a PS/2 interface or a keyboard with a USB interface) used in a desktop computer, or can be a part of a computer system having an input device (e.g., a touch pad on a notebook computer) that is in the form of a keyswitch, but the disclosure is not limited in this regard. That is, concepts of the keyboard device 100 of the disclosure can be used in any electronic product that performs input function by pressing.

Figure 2:
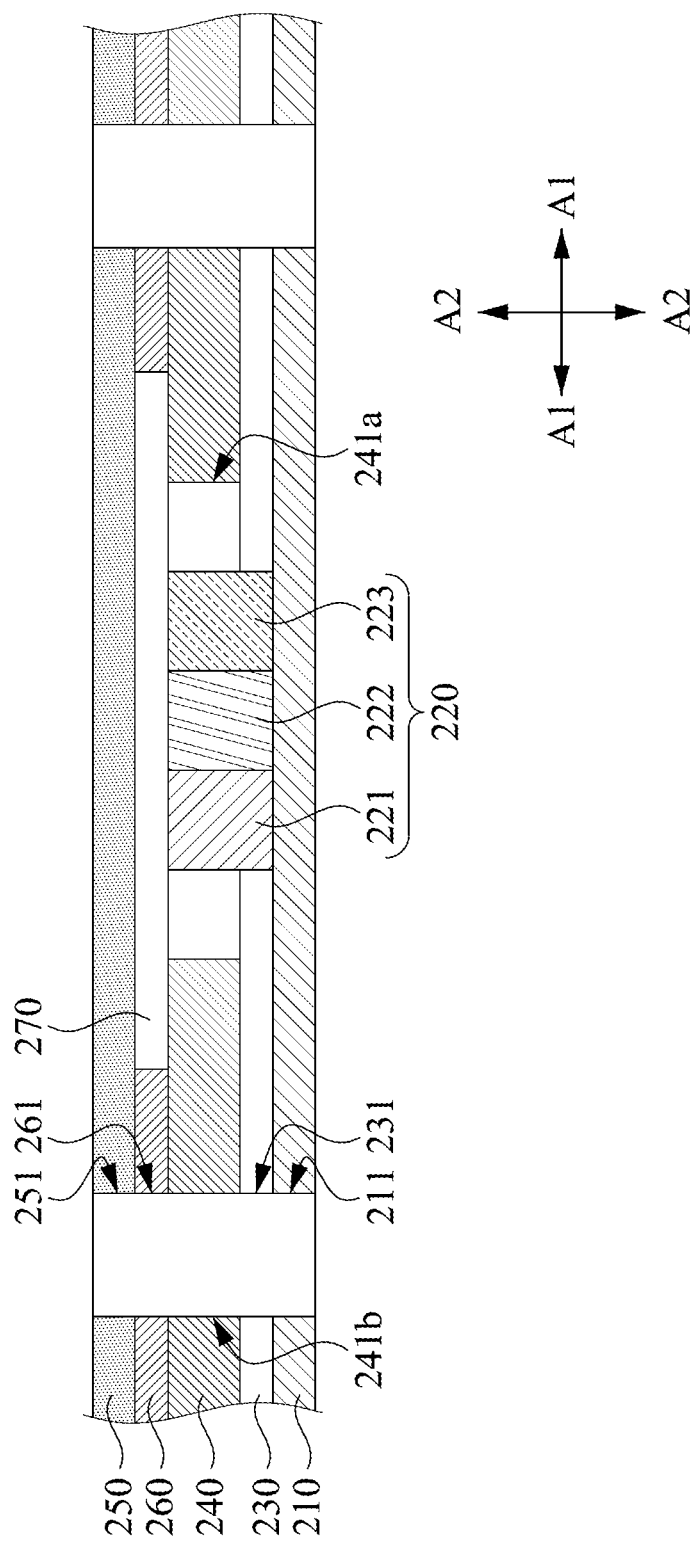
FIG. 2 is a partial cross-sectional view of a backlight module according to an embodiment of the disclosure.
Figure 3:
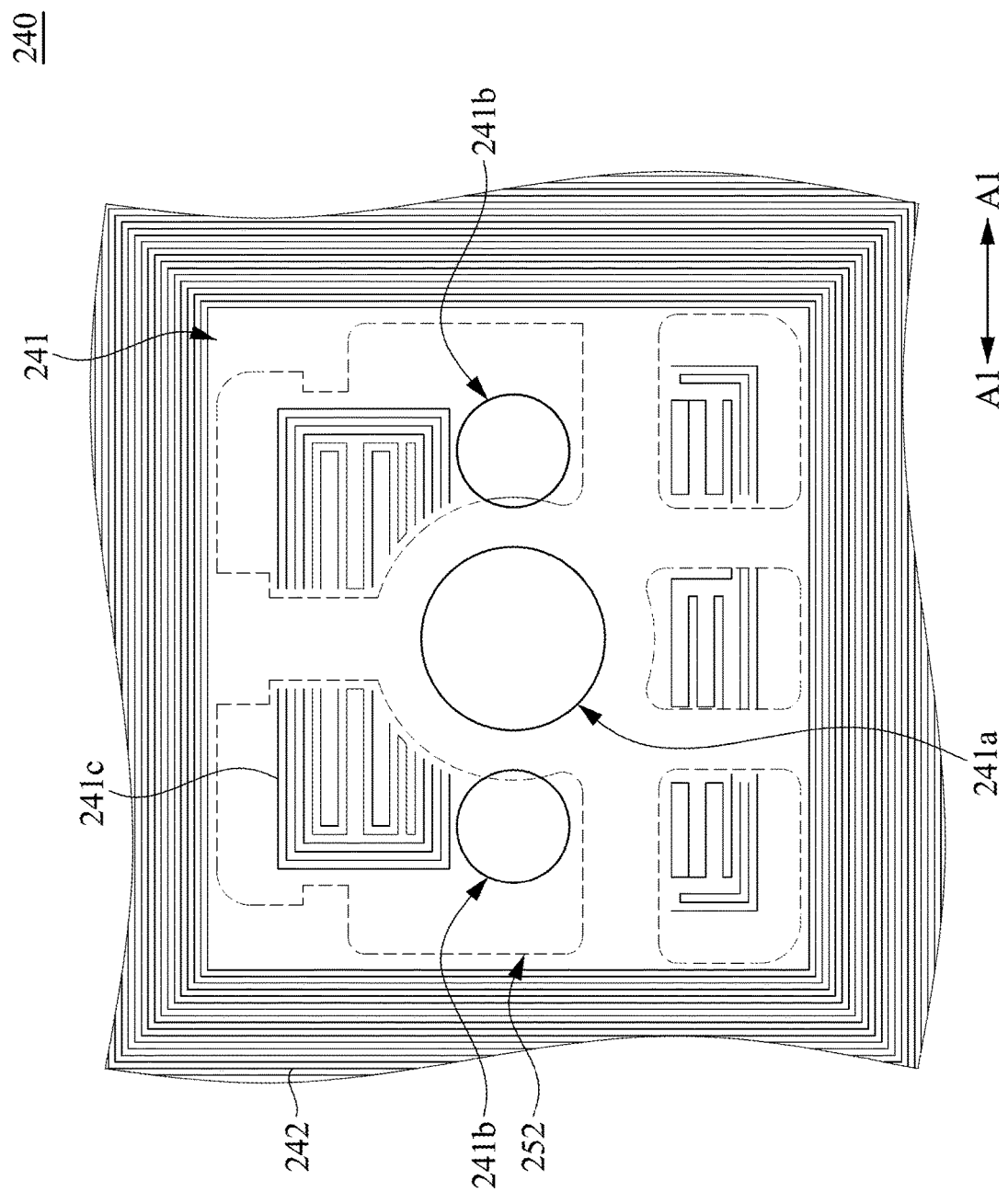
FIG. 3 is a partial top view of a light guide plate shown in FIG. 2.

Reference is made to FIGS. 2 and 3. FIG. 2 is a partial cross-sectional view of the backlight module 200 according to an embodiment of the disclosure. FIG. 3 is a partial top view of a light guide plate 240 shown in FIG. 2. As shown in FIGS. 2 and 3, in the present embodiment, the backlight module 200 includes a circuit board 210, a light-emitting unit 220, a light-reflecting plate 230, a light guide plate 240, and a light-shielding sheet 250. The light-emitting unit 220 is disposed on the circuit board 210. The light-reflecting plate 230 is disposed above the circuit board 210. The light guide plate 240 is disposed above the light-reflecting plate 230 and includes a single-key light guide area 241. The single-key light guide area 241 corresponds to one of the keyswitch assemblies 120. For example, the single-key light guide area 241 is defined by the orthographic projection of the aforementioned keyswitch assembly 120 on the light guide plate 240 (e.g., the orthographic projection of the keycap on the light guide plate 240), but the disclosure is not limited in this regard. The single-key light guide area 241 includes an accommodating hole 241a. The accommodating hole 241a runs through the single-key light guide area 241 and accommodates the light-emitting unit 220. The light-shielding sheet 250 is disposed above the light guide plate 240.

As shown in FIGS. 2 and 3, in the present embodiment, the light emitted by the light-emitting unit 220 can enter the light guide plate 240 through the inner wall of the accommodating hole 241a, and is totally reflected on the upper and lower surfaces of the light guide plate 240 to propagate in the light guide plate 240. The light-reflecting plate 230 can prevent light from leaving from the lower surface of the light guide plate 240, and thus can prevent light loss. In addition, as shown in FIG. 3, the single-key light guide area 241 further includes a first microstructure portion 241c. The first microstructure portion 241c is disposed at the bottom of the single-key light guide area 241. The light-shielding sheet 250 has a hollow portion 252 (indicated by a dotted line). The first microstructure portion 241c is configured to guide light emitted by the light-emitting unit 220 to the hollow portion 252. In other words, when the light propagating in the light guide plate 240 reaches the first microstructure portion 241c, it will be scattered upward by the first microstructure portion 241c, and then irradiated to the keyswitch assembly 120 above through the hollow portion 252 of the light-shielding sheet 250.

As shown in FIG. 2, in the present embodiment, the light-reflecting plate 230 is disposed on an area of the circuit board 210 not occupied by the light-emitting unit 220 and extends to an area right under the accommodating hole 241a and within an inner edge of the accommodating hole 241a. Hence, the light emitted downward by the light-emitting unit 220 in the accommodating hole 241a can be reflected upward by the light-reflecting plate 230, so that the light can enter the light guide plate 240 from the inner wall of the accommodating hole 241a.

As shown in FIGS. 2 and 3, in the present embodiment, the single-key light guide area 241 further includes two light-blocking structures 241b. The light-blocking structures 241b and the light-emitting unit 220 are arranged in a direction A1. With the structural configurations, the light-blocking structures 241b can be used to adjust the distribution of light emitted by the light-emitting unit 220, thereby effectively solving the problem of uneven brightness in different areas of the keyswitch assembly 120. In practical applications, the distance between the light-blocking structures 241b and the light-emitting unit 220 can be adjusted based on the aforementioned purpose.

As shown in FIG. 2, in the present embodiment, the light-emitting unit 220 includes a red light chip 221, a green light chip 222, and a blue light chip 223. The red light chip 221, the green light chip 222, and the blue light chip 223 are sequentially arranged in the direction A1. It can be seen that one of the light-blocking structures 241b is located on the side of the red light chip 221 away from the green light chip 222, and the other of the light-blocking structures 241b is located on the side of the blue light chip 223 away from the green light chip 222. With the structural configurations, the light-blocking structures 241b can destroy the light propagations of the red light chip 221 and the blue light chip 223 in the aforementioned direction A1, so as to effectively solve the problem of color unevenness caused by uneven light mixing.

In some embodiments, compared with the red light chip 221 and the blue light chip 223, the green light chip 222 has the greatest brightness. By arranging the green light chip 222 with the highest brightness between the red light chip 221 and the blue light chip 223 with lower brightness, the effect of solving the problem of color unevenness can be further improved.

As shown in FIGS. 2 and 3, in the present embodiment, the backlight module 200 further includes a light-absorbing layer 260. The light-absorbing layer 260 is disposed at a side of the light-shielding sheet 250 facing the light guide plate 240 and located over the light-blocking structures 241b in a stacking direction A2 of the light-shielding sheet 250 and the light guide plate 240. The light-absorbing layer 260 absorbs the unevenly mixed light guided by the light blocking structures 241b, which can further improve the effect of solving the problem of color unevenness.

As shown in FIG. 2, in the present embodiment, the backlight module 200 further includes a reflective layer 270. The reflective layer 270 is disposed between the light-shielding sheet 250 and the light-emitting unit 220. Hence, the light emitted upward by the light-emitting unit 220 can be reflected downward by the reflective layer 270, and the light can be mixed again to improve the uniformity of white light. Furthermore, the reflective layer 270 entirely covers an upper opening of the accommodating hole 241a, so as to prevent the light emitted by the light-emitting unit 220 from leaving the upper opening of the accommodating hole 241a, thereby ensuring that the light can enter the light guide plate 240 from the inner wall of the accommodating hole 241a.

As shown in FIGS. 2 and 3, in the present embodiment, the light-blocking structures 241b are two first through holes. The first through holes are respectively arranged at two sides of the light-emitting unit 220 in the direction A1. In addition, the circuit board 210 has two second through holes 211. The light-shielding sheet 250 has two third through holes 251. The light-reflecting plate 230 has two fourth through holes 231. The light-absorbing layer 260 has two fifth through holes 261. Each first through hole, the corresponding second through hole 211, the corresponding third through hole 251, the corresponding fourth through hole 231, and the corresponding fifth through hole 261 jointly form a heat dissipation channel. In this way, heat accumulation can be prevented and thus the performance of the keyboard device 100 will not be affected.

As shown in FIG. 3, in the present embodiment, the light guide plate 240 further includes a light guide structure 242. The light guide structure 242 is disposed to surround the single-key light guide area 241 and configured to guide the light emitted by the light-emitting unit 220 to the light-shielding sheet 250. In detail, when the light in the single-key light guide area 241 that is not guided by the first microstructure portion 241c propagates to the light guide structure 242, it will be guided by the light guide structure 242 toward the light-shielding sheet 250 and cannot continue to propagate to other single-key light guide areas 241 corresponding to the other keyswitch assemblies 120. Hence, the light guide structure 242 can effectively avoid the problem that the mutual influence of the light-emitting effects between adjacent single-key light guide areas 241.

In some embodiments, the first microstructure portion 241c and the light guide structure 242 are each composed of a plurality of microstructure units. As shown in FIG. 3, the microstructure unit of the first microstructure portion 241c and those of the light guide structure 242 are mesh line microstructures, but the disclosure is not limited in this regard. In some embodiments, an area ratio of the microstructure units of the light guide structure 242 in a unit area is greater than an area ratio of the microstructure units of the first microstructure portion 241c in a unit area. For example, as shown in FIG. 3, a distance between adjacent two lines of the mesh line microstructure of the light guide structure 242 is smaller than a distance between adjacent two lines of the mesh line microstructure of the first microstructure portion 241c. With the structural configurations, the effect of blocking light from propagating to the adjacent single-key light guide areas 241 can be further improved.

Figure 4:
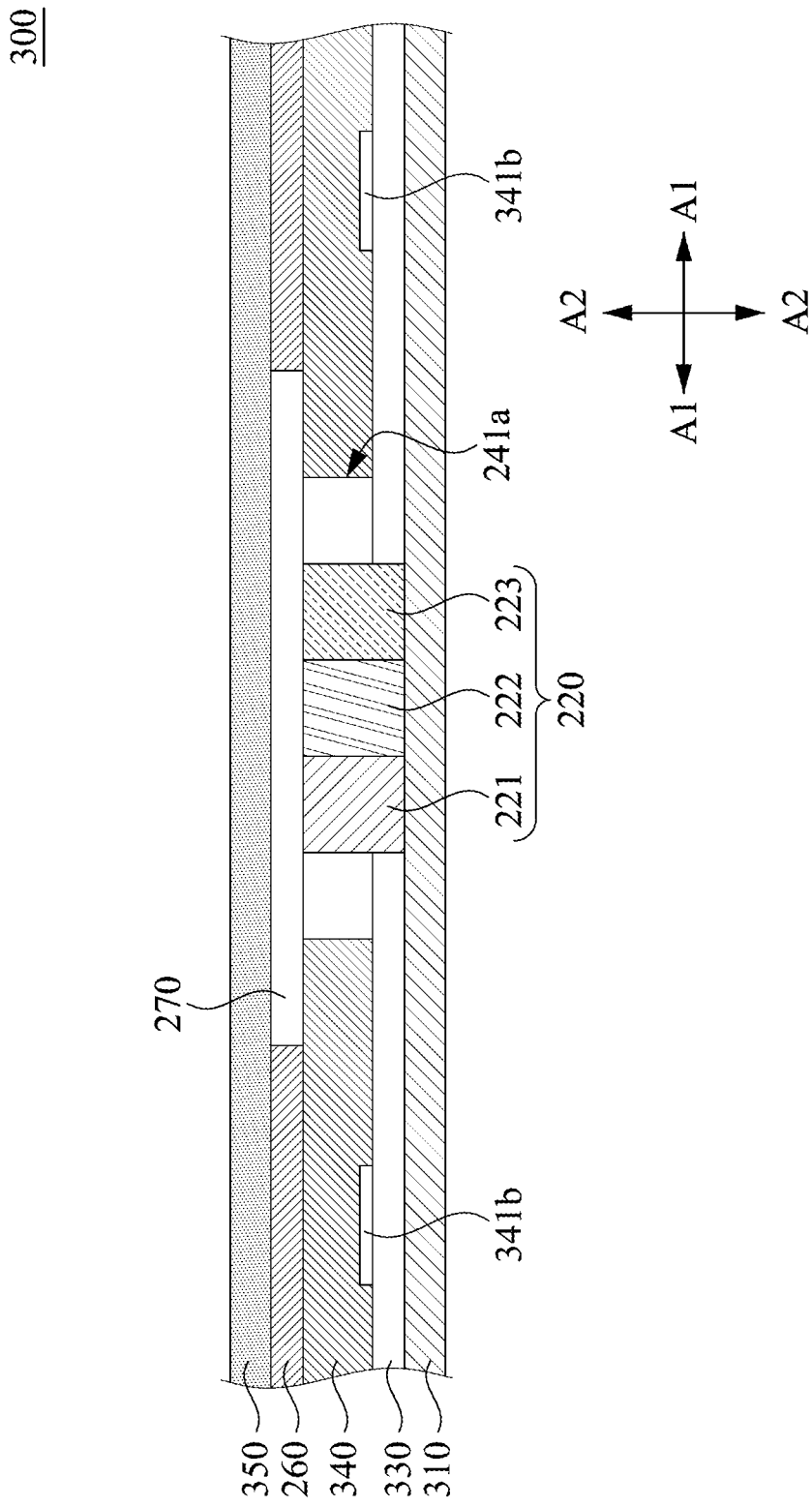
FIG. 4 is a partial cross-sectional view of a backlight module according to another embodiment of the disclosure.
Figure 5:
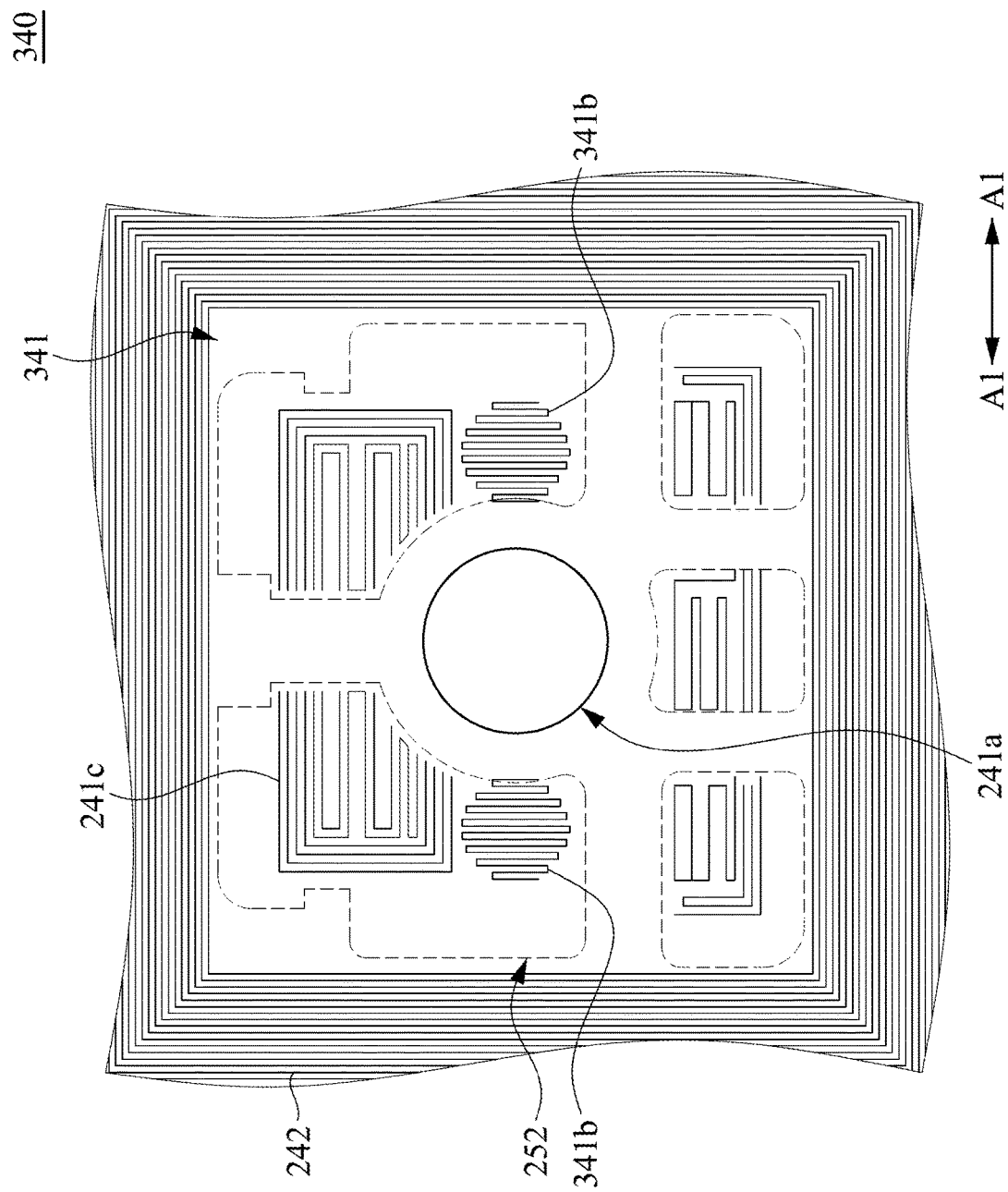
FIG. 5 is a partial top view of a light guide plate shown in FIG. 4.

Reference is made to FIGS. 4 and 5. FIG. 4 is a partial cross-sectional view of a backlight module 300 according to another embodiment of the disclosure. FIG. 5 is a partial top view of a light guide plate 340 shown in FIG. 4. As shown in FIGS. 4 and 5, in the present embodiment, the backlight module 300 includes a circuit board 310, a light-emitting unit 220, a light-reflecting plate 330, the light guide plate 340, a light-shielding sheet 350, a light-absorbing layer 260, and a reflective layer 270, and the stacking sequence and relative positions of these elements are the same as or similar to the corresponding components in the embodiment shown in FIG. 2. The backlight module 300 of the present embodiment is modified for the light-blocking structure 241b in FIG. 2. Specifically, in the present embodiment, the light-blocking structure 341b in the single-key light guide areas 341 is a second microstructure portion. The second microstructure portion is composed of a plurality of microstructure units. As shown in FIG. 5, the microstructure unit of the first microstructure portion 241c and those of the second microstructure portion are mesh line microstructures, but the disclosure is not limited in this regard. In some embodiments, an area ratio of the microstructure units of the second microstructure portion in a unit area is greater than an area ratio of the microstructure units of the first microstructure portion 241c in a unit area. For example, as shown in FIG. 5, a distance between adjacent two lines of the mesh line microstructure of the second microstructure portion is smaller than a distance between adjacent two lines of the mesh line microstructure of the first microstructure portion 241c. With the structural configurations, the light-blocking structure 341b can also be used to adjust the distribution of light emitted by the light-emitting unit 220, thereby effectively solving the problem of uneven brightness in different areas of the keyswitch assembly 120.

In addition, compared with the embodiment shown in FIG. 2, the backlight module 300 of the present embodiment has no heat dissipation channel. Under this structural configuration, the light-absorbing layer 360 is opposite to the second microstructure portion in the stacking direction A2 of the light-shielding sheet 350 and the light guide plate 340. The light-absorbing layer 360 absorbs the unevenly mixed light guided by the light-blocking structure 341b, which can further improve the effect of solving the problem of color unevenness.

Figure 6:
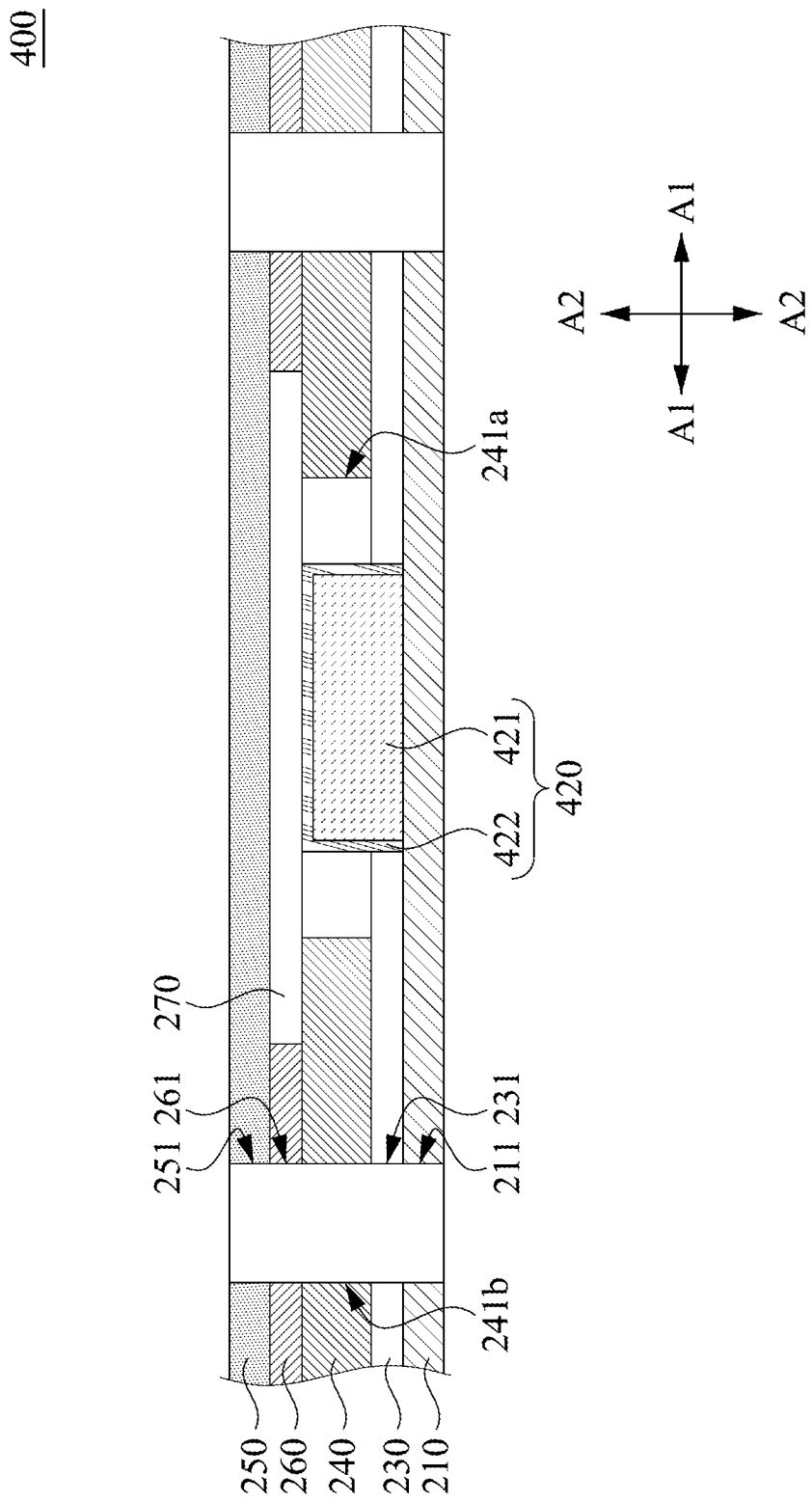
FIG. 6 is a partial cross-sectional view of a backlight module according to another embodiment of the disclosure.

Reference is made to FIG. 6. FIG. 6 is a partial cross-sectional view of a backlight module 400 according to another embodiment of the disclosure. As shown in FIG. 6, in the present embodiment, the backlight module 400 includes a circuit board 210, a light-emitting unit 420, a light-reflecting plate 230, a light guide plate 240, a light-shielding sheet 250, a light-absorbing layer 260, and a reflective layer 270, in which the circuit board 210, the light-reflecting plate 230, the light guide plate 240, the light-shielding sheet 250, the light-absorbing layer 260, and the reflective layer 270 are the same as those in the embodiment shown in FIG. 2, so the relevant descriptions of these components can be found above and will not be repeated here. The backlight module 400 of the present embodiment is modified for the light-emitting unit 220 in FIG. 2. Specifically, the light-emitting unit 420 of the present embodiment includes a blue light chip 421 and a phosphor 422 covering the blue light chip 421. The phosphor 422 is configured to convert part of the blue light emitted by the blue light chip 421 into yellow fluorescent light, and the yellow fluorescent light and the unconverted blue light can be mixed to obtain white light.

According to the foregoing recitations of the embodiments of the disclosure, it can be seen that in the backlight module of the present disclosure, the single-key light guide area of the light guide plate includes a light-blocking structure disposed on a side of the light-emitting unit, so the distribution of light emitted by the light-emitting unit can be adjusted, thereby effectively solving the problem of uneven brightness in different areas of a keyswitch. In addition, in the embodiment where the light-emitting unit includes chips of different colors, the light-blocking structure can also effectively solve the problem of color unevenness caused by uneven light mixing. In the embodiment where the light-blocking structure is a microstructure portion, the light-absorbing layer is disposed at the side of the light-shielding sheet facing the light guide plate and opposite to the light-blocking structure to achieve the purpose of light blocking. In the embodiment where the light-blocking structure is a through hole, in addition to achieving the same purpose of blocking light, the light-blocking structure can also be used as a heat dissipation hole. By disposing the light guide structure on the light guide plate to surround the single-key light guide area, the proportion of light emitted by the light-emitting unit propagating to the outside of the single-key light guide area can be effectively reduced. By arranging the chip with the highest brightness (for example, the green light chip) in the center of the light-emitting unit, the effect of solving the problem of color unevenness can be further improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a circuit board;
   a light-emitting unit disposed on the circuit board;
   a light-reflecting plate disposed above the circuit board;
   a light guide plate disposed above the light-reflecting plate and comprising a single-key light guide area, the single-key light guide area comprising:
      an accommodating hole running through the single-key light guide area and accommodating the light-emitting unit; and
      a light-blocking structure arranged in a direction with the light-emitting unit; and
   a light-shielding sheet disposed above the light guide plate.

2. The backlight module of claim 1, wherein the single-key light guide area further comprises a first microstructure portion, the light-shielding sheet has a hollow portion, and the first microstructure portion is configured to guide light emitted by the light-emitting unit to the hollow portion.

3. The backlight module of claim 2, wherein the light-blocking structure is a second microstructure portion, and the second microstructure portion is composed of a plurality of microstructure units.

4. The backlight module of claim 3, wherein the first microstructure portion is composed of a plurality of microstructure units, and an area ratio of the microstructure units of the second microstructure portion in a unit area is greater than an area ratio of the microstructure units of the first microstructure portion in a unit area.

5. The backlight module of claim 3, further comprising:
   a light-absorbing layer disposed at a side of the light-shielding sheet facing the light guide plate, and opposite to the second microstructure portion in a stacking direction of the light-shielding sheet and the light guide plate.

6. The backlight module of claim 2, wherein the light guide plate further comprises a light guide structure, and the light guide structure is disposed to surround the single-key light guide area and configured to guide light emitted by the light-emitting unit to the light-shielding sheet.

7. The backlight module of claim 6, wherein each of the first microstructure portion and the light guide structure is composed of a plurality of microstructure units, and an area ratio of the microstructure units of the light guide structure in a unit area is greater than an area ratio of the microstructure units of the first microstructure portion in a unit area.

8. The backlight module of claim 1, further comprising:
   a reflective layer disposed between the light-shielding sheet and the light-emitting unit and entirely covering an upper opening of the accommodating hole.

9. The backlight module of claim 1, wherein the light-reflecting plate is disposed on an area of the circuit board not occupied by the light-emitting unit and extends to an area within an inner edge of the accommodating hole.

10. The backlight module of claim 1, wherein the light-emitting unit comprises a red light chip, a green light chip, and a blue light chip, and the red light chip, the green light chip, and the blue light chip are sequentially arranged in the direction.

11. The backlight module of claim 1, wherein the light-emitting unit comprises a blue light chip and a phosphor covering the blue light chip.

12. The backlight module of claim 1, wherein the light-blocking structure comprises two through holes, and the through holes are respectively arranged at two sides of the light-emitting unit in the direction.

13. The backlight module of claim 12, wherein the through holes respectively constitute parts of two heat dissipation channels passing through the backlight module.

\* \* \* \* \*